(No Model.)

H. A. POTT.
TRACE HOLDER.

No. 313,765.  Patented Mar. 10, 1885.

Witnesses:
Aug. Bienreuth
Wm Uhl

Inventor:
Henry A. Pott

UNITED STATES PATENT OFFICE.

HENRY A. POTT, OF CAPE GIRARDEAU, MISSOURI.

TRACE-HOLDER.

SPECIFICATION forming part of Letters Patent No. 313,765, dated March 10, 1885.

Application filed November 3, 1884. (No model.)

*To all whom it may concern:*

Be it known that I, HENRY A. POTT, of Cape Girardeau, Cape Girardeau county, State of Missouri, have invented a new and Improved Hook for Holding Trace-Chains or Traces, of which the following is a full, clear, and exact description, reference being had to the annexed drawings, forming part of this specification.

Figure 1:
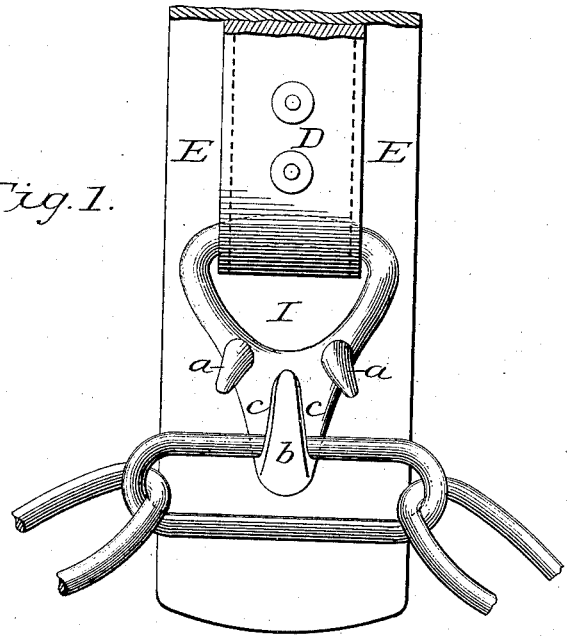
Figure 2:
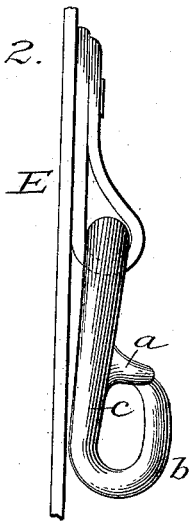
Figure 3:
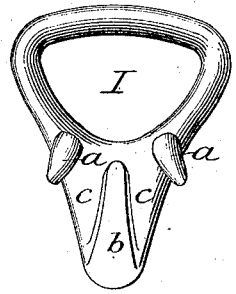

In the drawings, Figure 1 is a plan view of the hook attached to back-band and holding a chain therein. Fig. 2 is a perpendicular side view of same without the chain. Fig. 3 is a perspective view of the hook.

My invention consists of a metal hook having two prongs or studs extended above the hook, with large eye or opening in the body of said hook adapted to receive a piece of leather, by which said hook may be attached to the back-band by means of sewing or riveting.

Referring to these drawings, *a a* are the prongs or studs on each side of the hook and forming a part thereof. *b* is that part which receives the trace-chain or traces. The prongs or studs *a a* will prevent the traces from being unhooked in ordinary use. They will also prevent foreign objects from getting fastened into said hook and thereby causing trouble to teamsters.

C C is the body part of said hook, which, being broad and flat, will prevent the animals from getting chafed or bruised.

D is the piece of leather, one end of which is passed through the eye of the hook and doubled upon itself to be secured to the back-band E E by means of sewing or riveting.

By this arrangement a superior hook is obtained, which will prevent the animals from being bruised and the chains from becoming unfastened.

I am aware that there are patents for hooks operating somewhat on the same principle as mine—as, for instance, Patents Nos. 202,502 and 275,203; but neither of the said patents has the two prongs which are the characteristic of my invention.

What I claim as my invention, and desire to secure by Letters Patent, is—

A trace-carrier consisting of a piece of metal having a hook formed in one end and a loop in the other end, and having prongs or studs projecting from the body on the hook side thereof near the sides of the point of the hook, substantially as shown and described.

In witness whereof I, the said HENRY A. POTT, have hereunto set my hand.

HENRY A. POTT.

Witnesses:
EDWARD H. ENGELMANN,
EDWARD D. ENGELMANN.